(12) United States Patent
Statnikov

(10) Patent No.: US 11,215,693 B2
(45) Date of Patent: Jan. 4, 2022

(54) METHOD FOR TESTING A TARGET OBJECT AS SINGLE POINT SCATTERING CENTER

(71) Applicant: Aptiv Technologies Limited, St. Michael (BB)

(72) Inventor: Konstantin Statnikov, Düsseldorf (DE)

(73) Assignee: Aptiv Technologies Limited, St. Michael (BB)

( * ) Notice: Subject to any disclaimer, the term of this patent is extended or adjusted under 35 U.S.C. 154(b) by 324 days.

(21) Appl. No.: 16/298,261

(22) Filed: Mar. 11, 2019

(65) Prior Publication Data

US 2019/0353780 A1    Nov. 21, 2019

(30) Foreign Application Priority Data

Mar. 29, 2018 (EP) .................................... 18165097

(51) Int. Cl.
  *G01S 7/292*    (2006.01)
  *G01S 13/58*    (2006.01)
  (Continued)

(52) U.S. Cl.
  CPC ............ *G01S 7/292* (2013.01); *G01S 13/584* (2013.01); *G01S 13/931* (2013.01); *G01S 7/354* (2013.01); *G01S 13/9047* (2019.05); *G06F 17/14* (2013.01)

(58) Field of Classification Search
  CPC .... G01S 7/292; G01S 13/9047; G01S 13/584; G01S 13/931; G01S 7/354; G06F 17/14
  See application file for complete search history.

(56) References Cited

U.S. PATENT DOCUMENTS 4,527,161 A    7/1985  Wehner
4,866,448 A    9/1989  Rocca et al.
(Continued)

FOREIGN PATENT DOCUMENTS

EP    2520946    11/2012
EP    2998761     3/2016
(Continued)

OTHER PUBLICATIONS

"Notice of Allowance", U.S. Appl. No. 16/106,486, dated Feb. 22, 2021, 8 pages.
(Continued)

*Primary Examiner* — Matthew M Barker
(74) *Attorney, Agent, or Firm* — Colby Nipper PLLC

(57) ABSTRACT

A vehicle-based method of determining the extent to which a target object is a single point scattering center is provided, wherein the vehicle comprises a radar system including at least one radar transmit element adapted to send a radar signal towards the target object, and a plurality of receiver channels (elements or antennas), each being adapted to receive radar signals reflected from the target object. According to the method, a radar signal is transmitted from the at least one radar transmit element to the target object, and signals being reflected by the target object are received at the receiver channels. A frequency transformation of the reflected signals is performed in order to create a range-Doppler map for each of the plurality of receiver channels. Furthermore, a beam vector is generated by selecting a respective value from each of the range-Doppler maps as an element of the beam vector corresponding to a respective receiver channel. The beam vector is processed by a Fourier transform and a peak amplitude from the Fourier transform is calculated. Finally, a reference value is calculated which depends on the elements of the beam vector, and the peak (Continued)

amplitude is compared with the reference value in order to determine the extent to which the target object is a single point scattering center.

20 Claims, 7 Drawing Sheets

(51) Int. Cl.
  *G01S 13/931* (2020.01)
  *G01S 13/90* (2006.01)
  *G06F 17/14* (2006.01)
  *G01S 7/35* (2006.01)

(56) References Cited

U.S. PATENT DOCUMENTS

| | | | |
|---|---|---|---|
| 5,248,976 | A | 9/1993 | Niho et al. |
| 5,270,718 | A | 12/1993 | Didomizio |
| 8,044,846 | B1 | 10/2011 | Urkowitz et al. |
| 8,125,370 | B1 | 2/2012 | Rogers et al. |
| 9,310,468 | B2 | 4/2016 | Arage |
| 10,989,809 | B2 | 4/2021 | Ioffe et al. |
| 2005/0057391 | A1 | 3/2005 | Forsley et al. |
| 2010/0045513 | A1 | 2/2010 | Pett et al. |
| 2013/0169470 | A1 | 7/2013 | Emercy |
| 2015/0331086 | A1 | 11/2015 | Hassen |
| 2016/0084941 | A1 | 3/2016 | Arage |
| 2016/0084943 | A1 | 3/2016 | Arage |
| 2017/0059695 | A1 | 3/2017 | Fetterman et al. |
| 2018/0011170 | A1* | 1/2018 | Rao .................. G01S 13/343 |
| 2019/0079026 | A1 | 3/2019 | Statnikov et al. |
| 2019/0079180 | A1* | 3/2019 | Ioffe .................. G01S 13/583 |

FOREIGN PATENT DOCUMENTS

| | | |
|---|---|---|
| EP | 3144696 | 3/2017 |
| JP | 2014 235085 A | 12/2014 |

OTHER PUBLICATIONS

"Notice of Allowance", U.S. Appl. No. 16/106,486, dated Apr. 6, 2020, 10 pages.

"Notice of Allowance", U.S. Appl. No. 16/106,486, dated Nov. 20, 2020, 8 pages.

Winkler, "Range Doppler Detection for automotive FMCW Radars", Proceedings of the 4th European Radar Conference, 2007, 4 pages.

"Foreign Office Action", EP Application No. 18165097.9, dated Aug. 28, 2020, 5 pages.

"Foreign Office Action", EP Application No. 17190579.7, dated Feb. 19, 2021, 6 pages.

"Foreign Office Action", EP Application No. 17190581.3, dated Feb. 22, 2021, 5 pages.

* cited by examiner

METHOD FOR TESTING A TARGET OBJECT AS SINGLE POINT SCATTERING CENTER

TECHNICAL FIELD OF INVENTION

The present application relates to vehicle-based radar systems and methods, and in particular to a method of determining the extent to which a target object is a single point scattering center and to a system for performing the method.

BACKGROUND OF INVENTION

Self-localization, that is determining the precise location of a host vehicle, is one of the most important functions for accurate automated driving or such driver assistance schemes such as collision prevention systems. Current car navigation systems generally use a GPS navigation system to estimate the vehicle position. However, such a GPS navigation system is insufficient for precise self-localization of road vehicles due to effects such as reflections caused by buildings and occlusions of GPS signals from satellites. To overcome this problem, many landmark-based ego localization approaches have been elaborated in the past.

It is known to equip vehicles with radar systems/modules. Such radar systems are able to detect radar reflections (i.e. radar detections) from objects in the vicinity and process the data with respect to said radar reflections. Usually, the information needed for current self-localization and mapping (SLAM) procedure is collected from such (reflection/detection) data provided by the radar modules over multiple consecutive scans to identify for example a fixed landmark. This mapping information is updated over time, and a precise superposition of the individual radar-based maps with the GPS maps is performed. In such a way, for example the geographical position determined by GPS is accurately refined by such local data from radar returns.

Thus, in order to reduce the accumulation of errors introduced by non-precise superposition, landmark-based alignment of those radar images is a preferred solution. In the landmark-based SLAM procedure, a key task is to determine one or more suitable landmarks (i.e. objects) in the environment, i.e. in the vicinity of the vehicle which could serve as suitable and quality positional references (anchors) for precise superposition of the individual maps.

Available landmark determination approaches are based on e.g. signal-to-clutter ratio, point spread function matching, image analysis (e.g. by gradient analysis, or template matching etc.), likelihood ratio test, range bin variance analysis or differential interferogram methodologies. However, those approaches are not intended for the automotive environment. Landmarks have been previously examined by single-scan observations from a certain view-angle. Those approaches are typically not robust enough due to complexity of the automotive environment.

Determining whether an object is a single point scattering center can be helpful in determining whether a landmark is suitable so an aim is to determine the extent to which a scattering center under test (SUT) is a single point scattering center. For example, pulse-Doppler radar signal processing can be used to separate reflected signals into a number of "peaks", which occur in the two-dimensional (2D) spectral domain (called range-Doppler map). This spectral data collected from multiple radar receiver channels is utilized to carry out the here proposed single point scattering center test.

Several state-of-the-art techniques are known which can be used to determine whether a target response originates from a single point scattering center or not, as described in EP 3 144 696 A1. One method to analyze if a target response originates from a single point scattering center is to involve a (complex-valued) cross-correlation between the measured radar response with the corresponding so-called system-dependent Point Spread Function (PSF). PSF of a radar system describes namely its response to an ideal single point scattering target. If the correlation coefficient is below a (e.g. predetermined) threshold, then the target is considered not to be a single point scattering center.

The cross-correlation involves computational complexity. Additionally, this method is not very sensitive.

SUMMARY OF THE INVENTION

It is an object of the invention to provide a method which allows a reliable decision whether a target object identified is a single point scattering center and which has a low computational effort.

This object is achieved by a method comprising the features of claim 1.

In particular, a vehicle-based method is provided for determining the extent to which a target object is a single point scattering center. The vehicle comprises a radar system including at least one radar transmit element and a plurality of antenna receiver elements or channels. The at least one transmit element is adapted to send a radar signal towards the target object, whereas each of the plurality of antenna receiver elements is adapted to receive radar signals reflected from the target object.

According to the method, a) a radar signal is transmitted from the at least one radar transmit element to the target object, and b) the reflected signals of the signal transmitted in step a) from the target object are received at the receiver elements. Furthermore, a frequency transformation of the reflected signals is performed as step c) in order to create a range-Doppler map for each of the plurality of receiver elements.

The radar signals are typically "fired" as a sequence of L identical waveforms (wherein L is an integer greater than 1). After the reflected time-domain signals have been down-converted and sampled at a receiver channel, they are arranged in a two-dimensional data matrix. For example, each individual reflected signal (also called "beat signal") can be stored in a row of the data matrix comprising K samples (wherein K is an integer greater than 1). Thus, the respective time-domain data matrix has L rows and K columns. Typically, the data matrix is processed by a two-dimensional frequency transformation resulting in a so called range-Doppler map comprising so called range-Doppler frequency "bins". Due to the Doppler shift of the reflected radar signals which is a consequence of the movement of the vehicle and/or the target object, each range-Doppler frequency bin corresponds to a range from the radar system to a potential target and to a relative Doppler frequency shift caused by the relative radial range rate of the target.

According to the invention, post-processing steps are provided for the range-Doppler maps for the plurality of receiver elements. First, a beam vector is generated (step d) by selecting a respective value from each of the range-Doppler maps as an element of the beam vector corresponding to a respective receiver element. Since the frequency transformation of the reflected signals is usually performed by a Fourier transform using complex exponentials, the range-Doppler maps comprise complex values corresponding to the amplitude and phase information in the frequency-domain. If N receiver elements are provided for the radar system (wherein N is an integer greater than 1), N range-Doppler maps are present after the frequency transformation, and the beam vector comprises N elements, each being selected from a range-Doppler map corresponding to one of the receiver elements.

Thereafter, the beam vector is processed by a Fourier transform, and a peak amplitude is calculated from the Fourier transform (step e). This Fourier transform is preferably performed as a discrete Fourier transform, i.e. for each discrete frequency step as a sum over the elements of the beam vector multiplied by a phase factor comprising the respective frequency. In particular, for the discrete Fourier transform the algorithm of the fast Fourier transform (FFT) is used. In addition, a reference value is calculated which depends on the elements of the beam vector (step f). Finally, the peak amplitude is compared with the reference value in order to determine the extent to which the target object is a single point scattering center.

The reference value corresponds to a value which is expected for the peak amplitude of an object being a single point scattering center, i.e. an object creating an ideal point spread function (PSF) as described above. Thus, the comparison step g) provides a measure for the deviation of the reflected signals from such an ideal point spread function. In other words, a considerable deviation indicates that the target object comprises more than one scattering element.

Since the post-processing steps d) to g) are mostly based on a Fourier transform, the inventive method is very robust and has a low computational complexity and therefore low computational cost, in particular in comparison to methods using cross-correlation. Furthermore, the method is very sensitive since the expected peak value for a single point scattering center is used as a reference value and therefore small deviations from the expected peak amplitude can be identified.

Advantageous embodiments of the invention are described in the dependent claims, in the description and in the Figures.

In accordance with an advantageous embodiment, step f) of the method comprises calculating the reference value based on sum of absolute values of the beam vector elements. In this case, the reference value is a "non-coherent" summation of the amplitudes of the beam vector elements, i.e. no reduction of the amplitude due to phase shift between the receiver elements is considered which might be caused by more than one scattering target object. Therefore, the reference value calculated in this manner is the maximum value which can be achieved. Therefore, the sensitivity of the method is improved since any peak amplitude of the Fourier transform of the beam vector is smaller or equal to this reference value. In addition, the calculation of a sum of absolute values has a very low computational complexity.

In accordance with a further embodiment, step g) comprises that an uncertainty of the received reflected signals is calculated and that this uncertainty is incorporated into the comparison of the peak amplitude with the reference value. For example, the uncertainty of the reflected signals can be calculated based on a standard deviation of the reflected signals over a certain period of time. Thereafter, the calculated uncertainty can be transferred to the frequency domain by using the standard theorems for the Fourier transform, and a corresponding uncertainty for the peak amplitude and/or for the reference value can be determined. Thus, the uncertainty of the reflected signals can be used as a defined criterion for the comparison of step g), i.e. when comparing the peak amplitude with the reference value. Therefore, the reliability of the comparison according to step g) can be improved by taking into account the uncertainty of the reflected signals.

Furthermore, step g) can comprise that a relative deviation of peak amplitude and the reference value is calculated and that the relative deviation is compared with a threshold. By this comparison, a clear criterion is defined for the decision if the target object is a single point scattering center or not. This decision is a "hard" decision if a constant value for the threshold is used. However, the threshold is preferably calculated based on the signal-to-noise ratio of the reflected signals. By such a "dynamic" calculation of the threshold, the decision if the target object is a single point scattering center is "softened" to some extent. Thus, the comparison of the relative deviation with the threshold becomes more robust with respect to noisy signals, and the decision regarding the single scattering behavior of the target object is more reliable.

The elements of the beam vector are preferably normalized before performing step e), i.e. before the Fourier transform of the beam vector, in order to evaluate the phase of the elements of the beam vector. Therefore, the variation of the phase between the elements of the beam vector is considered only, i.e. the so-called "phase trajectory" of the elements of the beam vector. It turned out that it is sufficient for the comparison step g) to analyze this phase trajectory of the beam vector only for a reliable decision if the target object is a single point scattering center. Thus, the computational effort for performing the method can be reduced.

In accordance with a further embodiment, absolute values of the beam vector elements are calculated before the beam vector elements are normalized. Based on a maximum of these absolute values, a second reference value can be determined which can be used in step g) for an additional comparison with the peak amplitude from the Fourier transform. Therefore, the reliability of the comparison step g) is improved by using this second criterion.

Preferably, step d) comprises that the respective values (e.g. N respective complex values) corresponding to the elements of the beam vector are extracted from the N individual range-Doppler maps at a frequency location of local amplitude maxima ("peaks") which are determined, for example, in a integrated (e.g. non-coherently integrated) range-Doppler map. In particular, such a non-coherently integrated (NCI) range-Doppler map can be formed as a non-coherent average of the N available range-Doppler maps being extracted from the individual receiver elements or channels of the radar system.

A further subject of the invention is a vehicle-based radar system comprising the at least one radar transmit element and the plurality of antenna receiver elements as described above as well as a controller being adapted to output a transmit signal to the at least one radar transmit element and to receive signals from the plurality of antenna receiver elements. In addition, the controller is configured to perform a method of determining the extent to which a target object is a single point scattering center as described above.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention is described in the following by way of example with reference to advantageous embodiments and to the enclosed Figures. There are shown.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
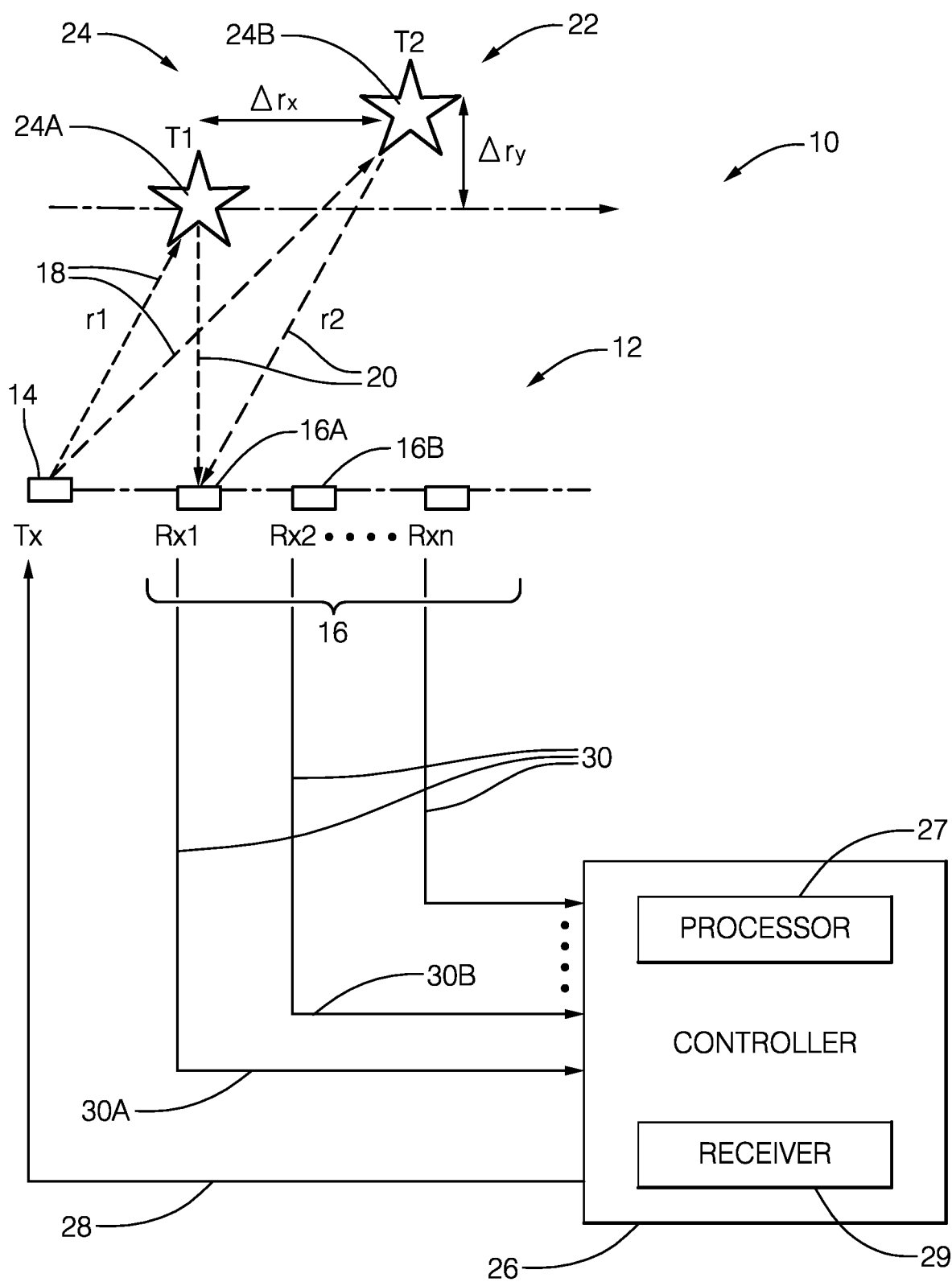
FIG. 1 illustrates a vehicle-based radar system in accordance with an embodiment of the invention.

FIG. 1 illustrates a vehicle-based radar system, hereafter referred to as the system 10. The system 10 includes an antenna array 12 that comprises at least one transmit element 14 and an array of receive elements, hereafter referred to as a plurality of antennas 16. It is recognized that one or more of the antenna elements that make up the antenna array 12 could be used to both transmit a radar signal 18, and output a detected signal 30 indicative of reflected radar signals 20 reflected by a first object 24A or a second object 24B in a field of view 22 of the system 10. The transmit element 14 and the plurality of antennas 16 are illustrated as distinct elements in this example only to simplify the explanation of the system 10. The first and second objects (target objects) may be suitable as landmarks, e.g. a for self-localization and mapping (SLAM) procedure, if they are stationary and if they are single point scattering center.

The system 10 includes a controller 26 configured to output a transmit signal 28 to the transmit element 14, and configured to receive detected signals 30 from each antenna, for example a first signal 30A from a first antenna 16A and a second signal 30B from a second antenna 16B. Each of the detected signals 30 correspond to the reflected radar signal 20 that was detected by one of the plurality of antennas 16. The controller 26 includes a processor 27 such as a microprocessor, digital signal processor, or other control/signal conditioning circuitry such as analog and/or digital control circuitry including an application specific integrated circuit (ASIC) for processing data. The controller 26 includes memory (not shown), including non-volatile memory, such as electrically erasable programmable read-only memory (EEPROM) for storing one or more routines, thresholds and captured data. One or more routines are executed by the processor 27 to perform steps (as described below with respect to FIG. 2) for determining if the detected signals 30 received by the controller 26 indicate the presence of the first object 24A and/or the second object 24B.

Furthermore, the controller 26 includes a receiver 29 configured to receive an antenna signal (e.g. the first signal 30A and the second signal 30B) from each antenna (e.g. the first antenna 16A and the second antenna 16B) corresponding to the reflected radar signal 20 that was detected by each of the plurality of antennas 16. The controller 26 may include a mixer (not shown) and a local oscillator (not shown) in order to demodulate the detected signals 30. The mixer and the local oscillator may be part of the receiver 29.

To meet customer specified angular-resolution requirements of automotive radar systems, such systems often use antennas that have relatively narrow transmit and receive beam-widths to scan a field of view for objects. The transmit element 14 radiates or emits the radar signal 18 toward the first object 24A and/or the second object 24B in a field of view 22, and each of the plurality of antennas 16 detects a reflected radar signal reflected by the first object 24A and/or the second object 24B in the field of view 22 of the system 10. Characteristics of the reflected radar signal 20 depend on a backscatter property or radar cross section (RCS) of the first object 24A or the second object 24B. The characteristics also depend on distance, direction, and relative motion of the first object 24A and/or the second object 24B relative to the antenna array 12, which influences the Doppler shift of the reflected radar signal 20.

If multiple objects are present in the field of view 22, the reflected radar signal 20 may interfere with each other depending on the relative position and/or range rate difference between the objects with respect to the receive antennas (the plurality of antennas 16). A relative position difference between the first object 24A and the second object 24B is illustrated as Δrx and Δry and may be exhibited in terms of a relative phase difference between the reflected radar signal 20 detected by the antennas 16 from these scattering centers. That may cause the detected signals 30 to exhibit dissimilar interference characteristics for the signals from the scattering centers of the objects due to the fact that the relative phase difference changes across the plurality of antennas 16. This leads to different range profiles and Doppler profiles across the plurality of antennas 16.

Figure 2:
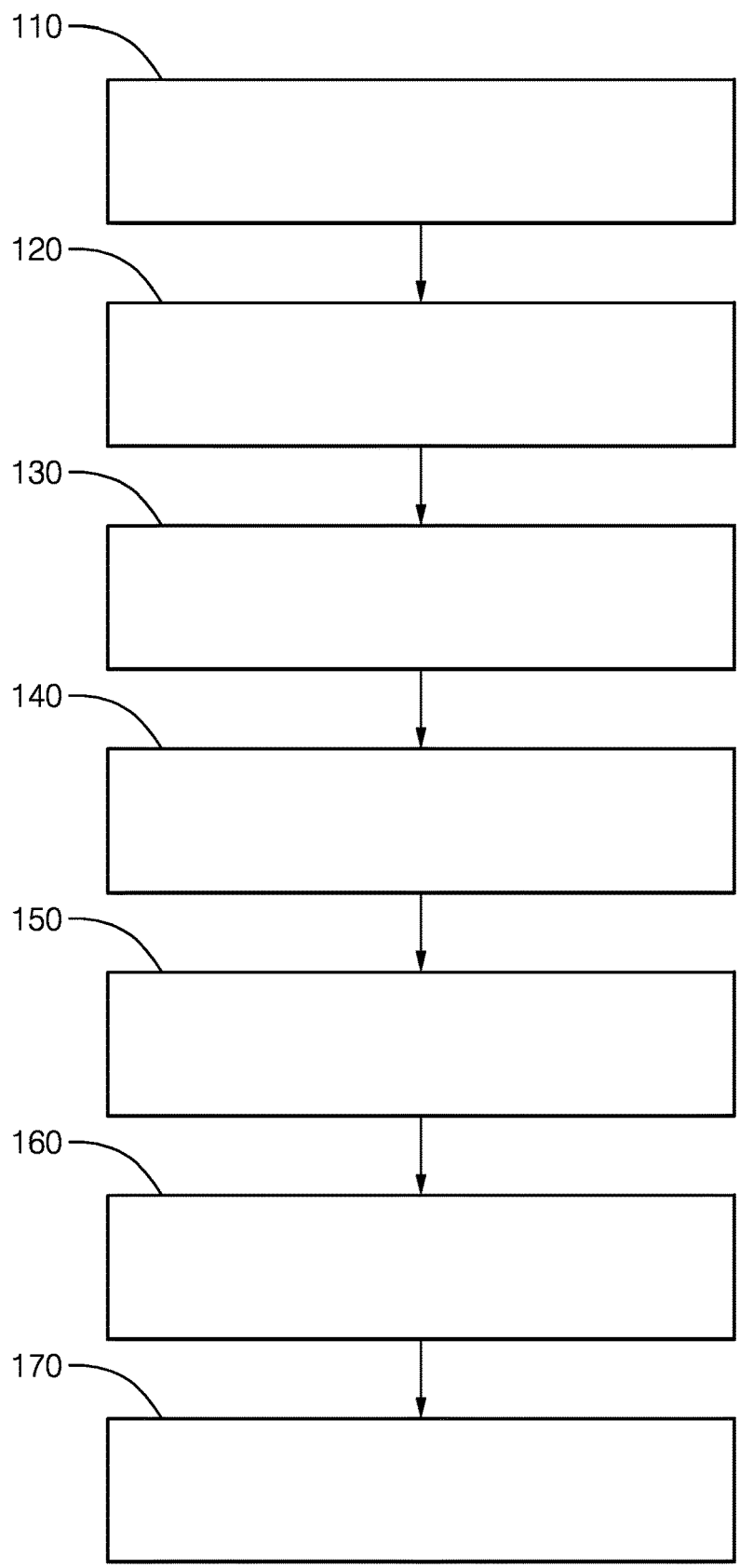
FIG. 2 illustrates a flowchart of a method in accordance with a further embodiment of the invention.

FIG. 2 shows a flowchart for the inventive method of determining the extent to which the target object 24A, 24B is a single point scattering center. At step 110, a radar signal 18 is transmitted from the radar transmit element 14 to the target object 24A, 24B (see FIG. 1). The transmitting of the radar signal 18 is triggered by the transmit signal 28 which is output by the controller 26. At step 120, signals 20 being reflected from the target object 24A, 24B and corresponding to the signal 18 transmitted at step 110 are received at the receiver elements 16. The detected signal 30 corresponding to the reflected signals 20 are output by the receiver elements 16 and received by the controller 26.

The detected signals 30 are time-domain signals that the controller 26 samples and performs a frequency transformation (e.g. a Fourier transform) at step 130 in order to create frequency profiles for each of the detected signals 30, i.e. for each receiver element 16. The frequency transformation of radar reflections arising from emitted radar signals is known to indicate the range to a target. Alternatively, the frequency profiles generated by the frequency transform can be characterized as a Doppler profile. Therefore, the frequency transformation of the reflected signals creates a so-called range-Doppler map comprising range-Doppler frequency "bins" (ranges) for each of the receiver elements 16. Due to the Doppler shift of the reflected radar signals which is a consequence of the movement of the vehicle and/or the target object, each range-Doppler frequency bin corresponds to a range between the radar system 10, i.e. the antenna 16, and the target objects 24A, 24B, and corresponds to a relative Doppler frequency shift caused by the relative radial range rate of the target objects 24A, 24B.

The range-Doppler maps created by the frequency transformation of the reflected signals comprise amplitude and phase information. Therefore, it is convenient to represent the data of the frequency profiles or range-Doppler maps as complex values comprising the amplitude and phase information.

If the radar system 10 comprises N receiver channels (physical or virtual elements) or antennas 16, N complex-valued range-Doppler maps are further evaluated at step 140.

The frequency locations of local amplitude maxima ("peaks") are determined in each non-coherently integrated (NCI) range-Doppler map. Such a peak originates usually from a single scattering center or target object. However, due to the interference between signals from target objects 24A, 24B being located in a relative close proximity to each other in space (and having a similar Doppler shift frequency), maxima corresponding to different target objects can possibly not be dissolved within the frequency profiles or range-Doppler maps. Therefore, the post-processing steps 140 to 170 are performed by the method in order to decide if the reflected signals 20 originate from a single target object, as for example 24A, or from at least two target objects 24A, 24B.

Therefore, a so-called beam vector is generated at step 140 by selecting a respective complex value from each of the N range-Doppler maps at the maximum or "peak" position of the amplitude. Thus, the beam vector comprises N elements, each of which corresponds to a respective receiver channel (element or antenna) 16. At 150, the beam vector is processed by a discrete Fourier transform which is defined by $$X(\omega_k) = \Sigma_{n=0}^{N-1} x(n) e^{-j\omega_k n} \quad (1)$$

wherein x(n) is the beam vector generated at step 140 as "input" for the discrete Fourier transform, and $$\omega_k = 2\pi k/N \quad (2)$$

It should be noted that the discrete Fourier transform (DFT) is performed in practice with M values, wherein M is usually a power of 2 and N≤M, using the algorithm of the fast Fourier transform (FFT). The input for the discrete Fourier transform is filled with zeros for the elements missing in the original beam vector if N<M, i.e. for N+1 to M (so-called "zero-padding") in order to implicitly interpolate the data points of the resulting transform function.

Next, a peak amplitude $A_{max}$ of the discrete Fourier transform is determined at a frequency $\omega_{peak}$, i.e.

$$A_{max} = |X(\omega_{peak})| = |\Sigma_{n=0}^{N-1} x_{DC}(n)| = |\Sigma_{n=0}^{N-1} x(n) e^{-j\omega_{peak} n}| \quad (3)$$

The discrete Fourier transform can be regarded as comprising N bandpass filters tuned to center frequencies wk. The discrete Fourier transform can also be considered as performing a complex demodulation or frequency shift, i.e. a "down-conversion" with respect to phase, for each input signal x(n) by the multiplication with the phase factor. It should be noted that the discrete Fourier transform implicitly performs a so-called coherent summation of the elements x(n) since these are multiplied by a phase factor $e^{-j\omega_k n}$ (down converted) before the summation is performed.

An important observation regarding the Fourier transform of the beam vector as defined above is the following: only if all N values or summands have the same phase after the multiplication with the phase factor $e^{-\omega_k n}$ (which is the case for an ideal single point scattering center or point spread function), the absolute value of the discrete Fourier transform will result in $$T_{max} = \Sigma_{n=0}^{N-1} |x_{DC,SSR}(n)| \quad (4)$$

$X_{DC,SSR}(n)$ is the "down-converted" beam vector resulting from a single point scattering center.

Thus, only a "clean" or ideal signal of a single point scattering center will result in a maximum amplitude $T_{max}$ which is calculated by the "non-coherent" summation of the absolute values of the elements of the beam vector:

$$T_{max} = \Sigma_{n=0}^{N-1} |x(n)| \geq A_{max} \quad (5)$$

Please note that $T_{max}$ is always greater than or equals to $A_{max}$ which is determined from the discrete Fourier transform performing a coherent summation. This is due to the fact that the sum of absolute values is always greater than or equals to the absolute value of the sum. As such, $T_{max}$ is calculated at 160 as a first reference value which represents the maximum amplitude of the discrete Fourier transform which can be expected from a single point scattering center.

Finally, the peak amplitude $A_{max}$ and the reference value $T_{max}$ are compared at 170 in order to decide if the target object or point scattering center under test (SUT) is a single point scattering center. In order to perform this comparison, the relative deviation of $A_{max}$ with respect to $T_{max}$ is calculated:

$$dev_{PH} = \frac{T_{max} - A_{max}}{T_{max}} \quad (6)$$

This deviation is compared with a threshold depending on the signal-to-noise ratio of the detected signals 30. If the deviation is larger than the threshold, a decision is made that the target object or scattering center under test (SUT) is not a single point scattering center.

For performing the method steps described above, it is not necessary to consider the amplitude variation among the elements of the beam vector x(n). Therefore, the amplitudes can be normalized before performing the discrete Fourier transform in order to analyze the deviation of the phase of the elements x(n) from an ideal or "clean" single point scattering center. However, as an optional additional test, the amplitude variation over the elements of the beam vector is also considered by calculating a second reference value:

$$T_{max,AM+PH} = N \cdot \max(|x(n)|) \quad (7)$$

According to this formula, the maximum of the absolute values of the elements of the beam vector is calculated before the normalization is performed, and this maximum is multiplied by N. By this means, a second relative deviation with respect to the second reference value $T_{max,AM+PH}$ is calculated considering the amplitude and phase variation over the elements of the beam vector:

$$dev_{AM+PH} = \frac{T_{max,AM+PH} - A_{max}}{T_{max,AM+PH}} \quad (8)$$

By calculating this second deviation and comparing it with a respective threshold, the reliability of the test regarding a single point scattering center can be improved.

Figure 4A:
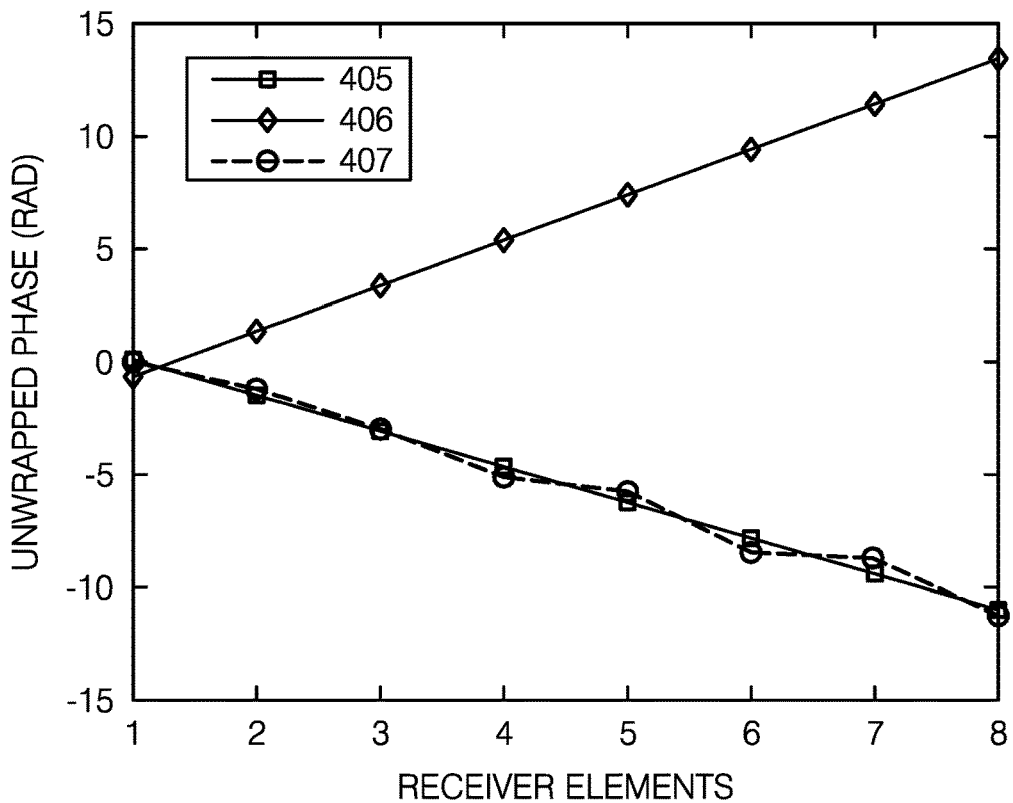
FIGS. 4a), b) and c) illustrate an example for results generated by the inventive method for a superposition of signals originating from two scattering objects.
Figure 4B:
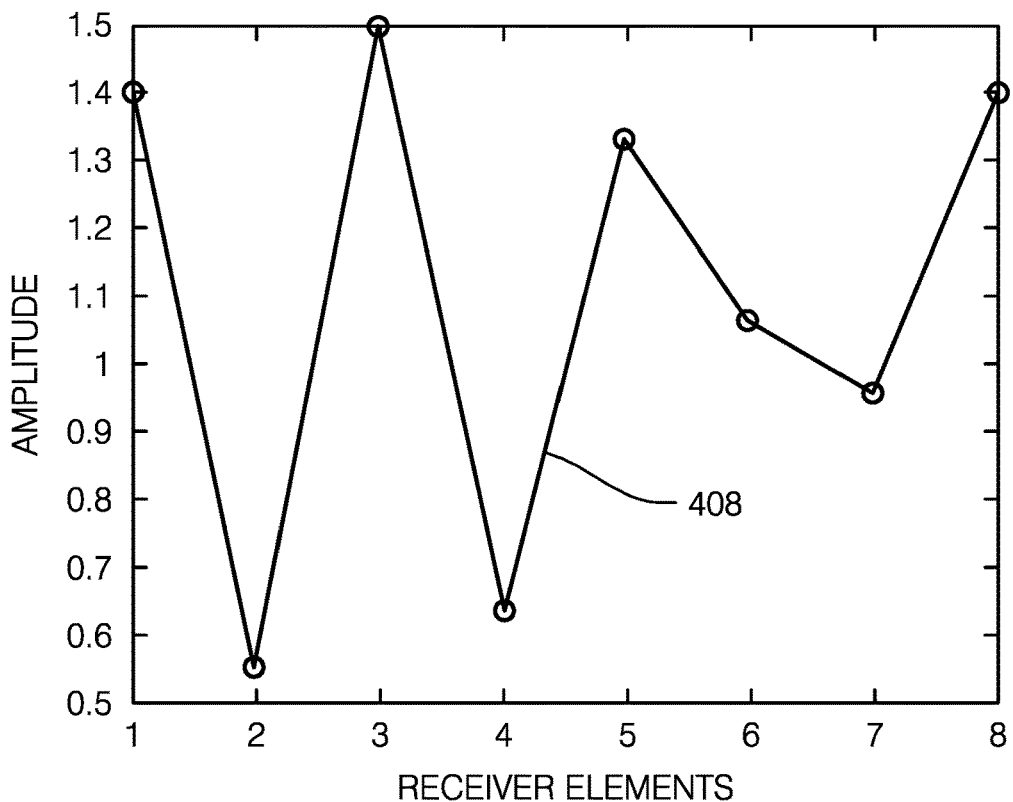
Figure 4C:
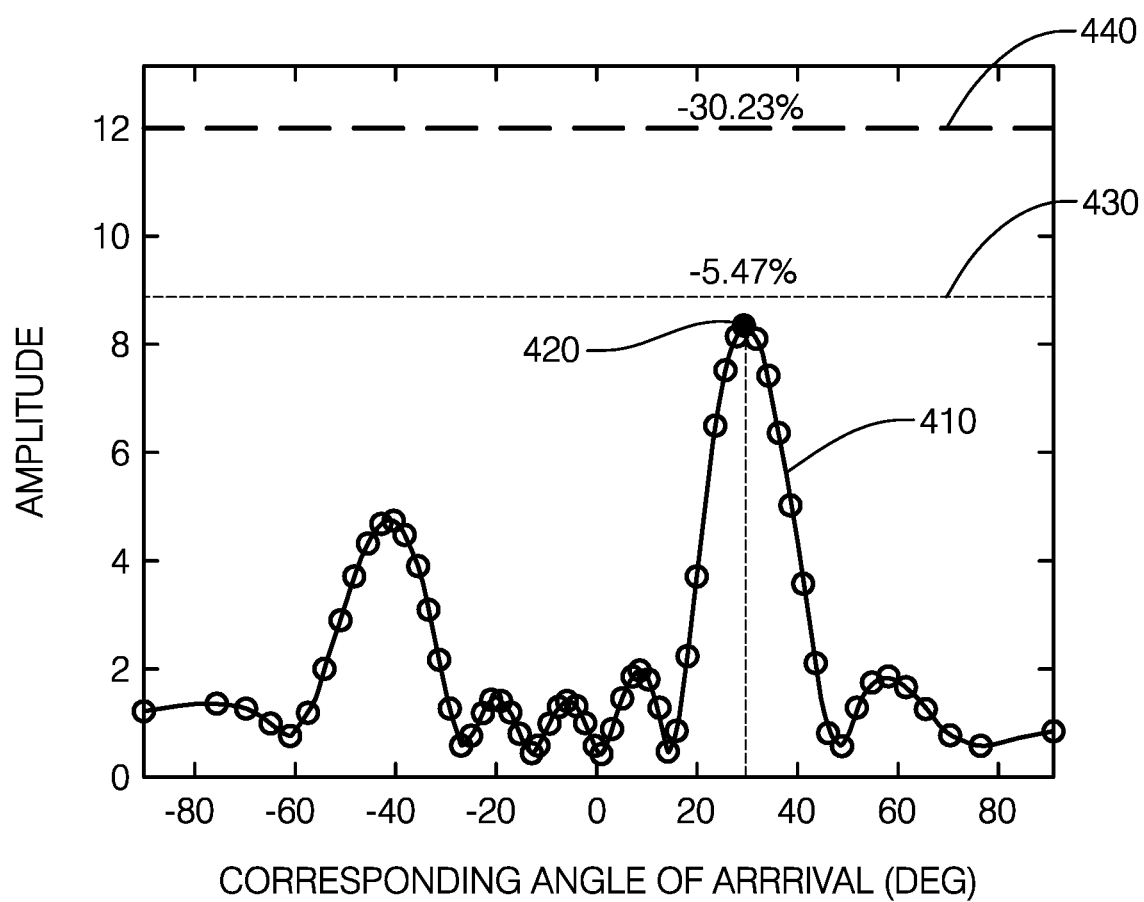
Figure 5A:
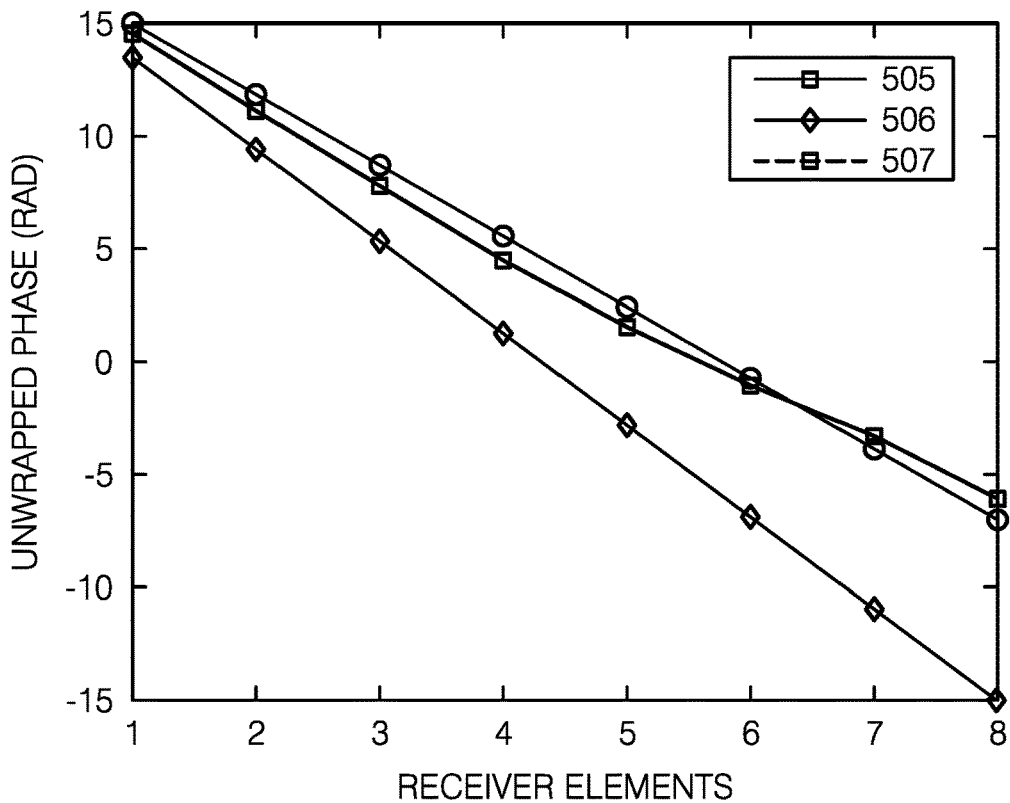
FIGS. 5a), b) and c) illustrate a further example for results generated by the inventive method for a superposition of signals originating from two scattering objects.
Figure 5B:
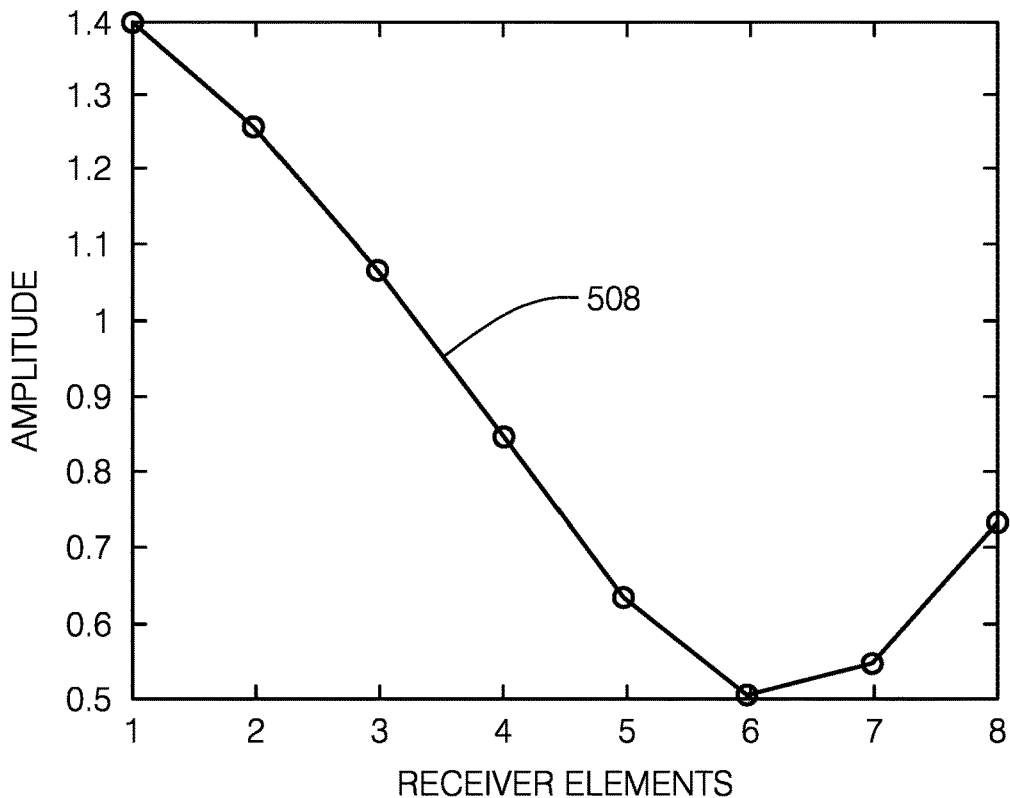

FIGS. 3, 4 and 5 show examples for results generated by the inventive method. In FIG. 3, simulated data for an ideal single point scattering center is analyzed, whereas FIGS. 4 and 5 show results for analyzing a superposition of simulated signals originating from two different scattering centers.

Figure 3A:
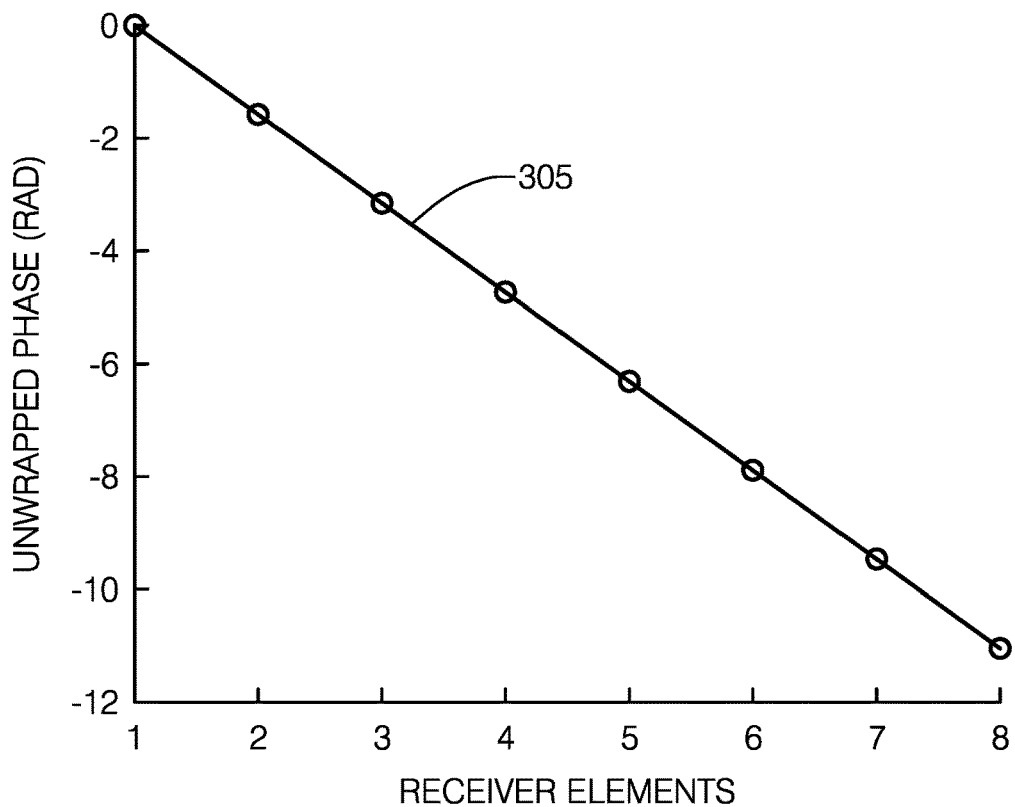
FIGS. 3a) and b) illustrate an example for results generated by the inventive method for a single scattering object.

FIG. 3a) shows a phase trajectory of a signal A which is simulated for an ideal single point scattering center like the target object 24A in FIG. 1. An angle of incidence of +30° is assumed with respect to the receiving elements 16 (see FIG. 1), and the initial phase φ_0 and the amplitude of the signals are assumed to be constant, i.e. φ_0=0 and amp=1.0. This means that a slight difference between the amplitude of the signal at the different receiving elements, e.g. antennas 16A and 16B, is neglected. However, due to the spatial separation of the receiver elements 16 there is a phase difference between the signals received at the different receiving elements. As a constant distance between the receiver elements is assumed, e.g. like the distance between the antennas 16A and 16B, there is a constant delay between the signals leading to a constant phase difference and a constant slope in the corresponding phase trajectory, as shown in FIG. 3a).

In FIG. 3a), the number of the receiver element 16 is presented on the x-axis, whereas on the y-axis an unwrapped phase 305 in rad is presented. Unwrapped phase means that the typical jumps for 2π in the phase are not considered here which occur when the phase function reaches +π or −π. In other words, the simulated signal as shown is corrected for those phase jumps by "unwrapping" (for a better visualization). Please note that such a phase jump of 2π does not influence the result of the Fourier transform which is performed according to the inventive method, since exp(i2π)=1. Thus, no unwrapping of the phase is required before performing the inventive method.

A beam vector is generated from the input data described above, i.e. using a constant amplitude and the phase as shown in FIG. 3a) as complex values for each receiver element. Thus, the beam vector comprises eight elements for the present example corresponding to eight receiver channels (elements).

Figure 3B:
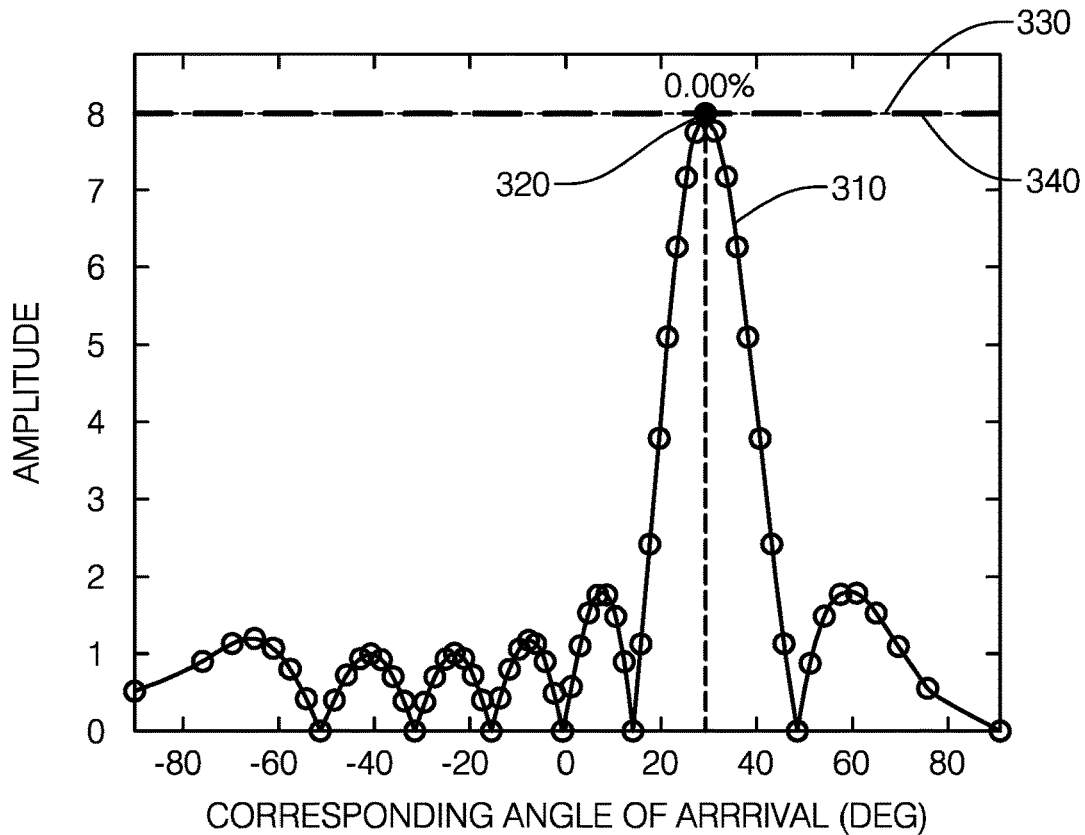

In FIG. 3b), the amplitude 310 of the Fourier transform of the beam vector is shown on the y-axis, whereas a corresponding angle of arrival in degrees is presented on the x-axis. Due to the correspondence to the angle of arrival, this Fourier transform is also called "beam forming" Fourier transform. Before performing the Fourier transform as fast Fourier transform (FFT), here the beam vector is filled up with zeros up to 64 elements in order to increase the number of frequency data points of the Fourier transform, as it is common practice. The identification of a maximum of the Fourier transform is improved by this artificial interpolation due to the increase of frequency data points. However, the resolution of the Fourier transform is not altered by this means, and the Fourier transform of FIG. 3b) shows the typical shape of sin x/x for a signal having a constant amplitude and frequency.

In order to evaluate the amplitude response 310 of the Fourier transform, the amplitude maximum 320 of the amplitude response 310 is determined. The determination of such a maximum is common practice in numerical mathematics and will not be discussed in detail here. Please note that the maximum for the present Fourier transform in FIG. 3b) is located at a spatial frequency corresponding to an incident angle of 30° as expected due to the input data.

In order to decide if the input data originate from a single point scattering center, the first and the second reference value $T_{max}$ and $T_{max,\ AM+PH}$ are calculated as described above according to formula (4) and (8), respectively. For the first reference value, the phase of the input beam vector is considered only, i.e. the amplitudes are normalized to 1.0. For the second reference value, amplitude and phase information is considered as described above in order to improve the reliability of the test regarding a single point scattering center. The first and second reference values are shown as thin and bold dashed line in FIG. 3b), respectively. Please note that both reference values coincide for the present example due to the constant amplitude being set to 1.0.

In addition, the amplitude maximum 320 and the reference values 330, 340 coincide as well, i.e. the deviation calculated according to formulas (7) and (9) is zero. Therefore, the results shown in FIG. 3 demonstrate that data originating from a single point scattering center can be properly identified by the inventive method.

In FIGS. 4a) and 5a), phase trajectories for two different signals A and B as well as the phase trajectory for their superposition are shown. The signal A is the same as used for FIG. 3, i.e. having an angle of incidence of +30°, an initial phase of π_0=0 and an amplitude of amp=1.0. The second signal B has half the amplitude of signal A, i.e. amp=0.5, and an initial phase of π_0=−π/4. For FIG. 4a), the angle of incidence for signal B is −40°, whereas for FIG. 5a), the angle of incidence for signal B is +40°.

The individual phase trajectories of the signals A and B are shown as 405, 505 and 406, 506, respectively, in FIGS. 4a) and 5a). In addition, the complex-valued superposition of signal A and signal B are shown, i.e. the superposition of the phases as 407, 507 in FIGS. 4a) and 5a), whereas the superposition 408, 508 of the amplitudes is displayed in FIGS. 4b) and 5b), respectively.

In FIGS. 4c) and 5c), the amplitude of the Fourier transform 410, 510 is presented for the superposition of the signals as displayed in FIG. 4a) and b) as well as 5a) and b). The corresponding first reference value 430, 530 (considering the phase only, normalized amplitudes) and second reference values 440, 540 (taking amplitude and phase into account) is calculated as described for 330, 340 with respect to FIG. 3b). These reference values are compared with the respective amplitude maximum 420, 520 for each amplitude response 410, 510.

FIGS. 4c) and 5c) demonstrate that there is a significant deviation between the amplitude maximum of the Fourier transform of the superimposed signals and the reference values. As can be expected, the relative deviation as calculated according to formula (7) and taking phase into account only is much smaller than the deviation calculated according to formula (9) and taking into account amplitude and phase. However, even for the signals A and B having a similar angle of incidence of +30° and +40°, there is a significant deviation of −2.65% between the amplitude maximum of the Fourier transform and the first reference value considering the phase only. This deviation is sufficient to identify that there are two scattering centers, i.e. that the signals under test originate from a non-single scattering source.

Figure 5C:
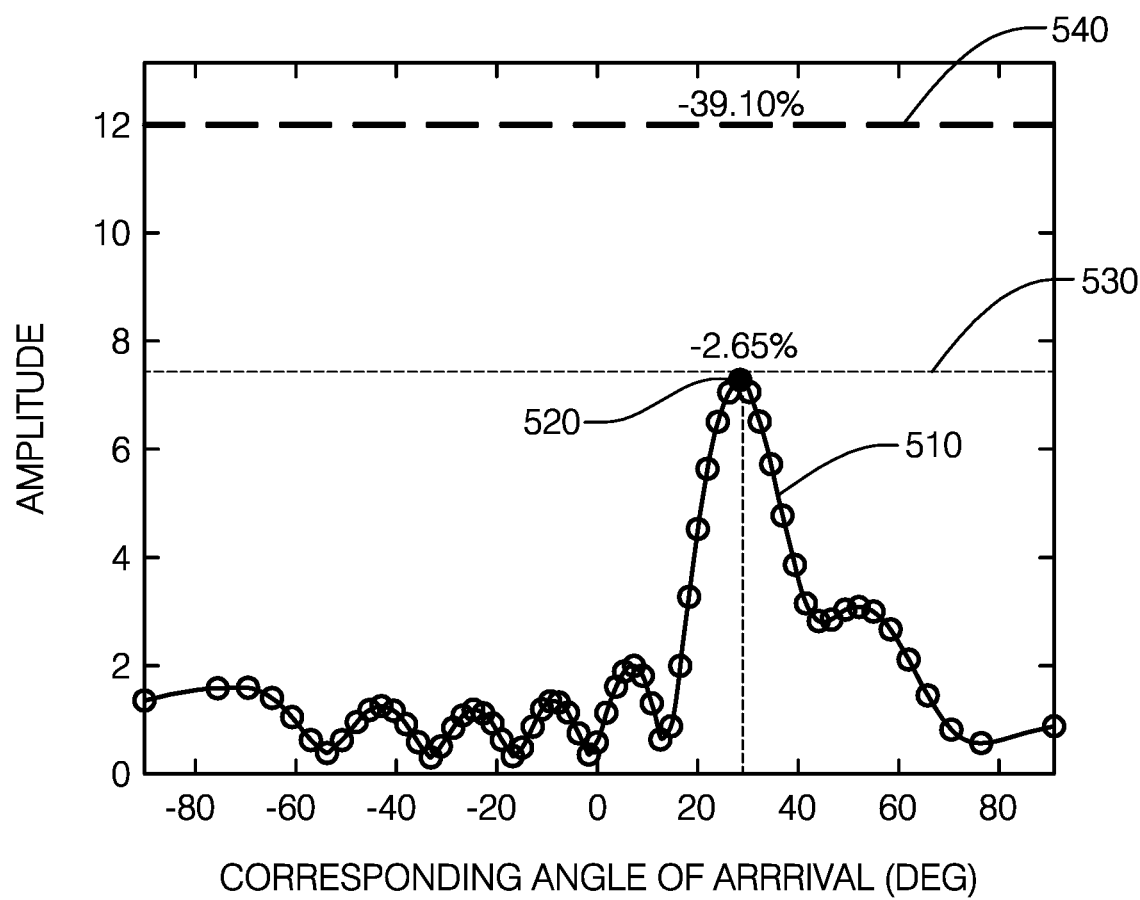

For the signals analyzed in FIG. 4c), the deviation between the amplitude maximum and the first reference value is −5.47% and much greater than for FIG. 5c), as can be expected due to the difference in the angle of incidence for signals A and B. In both cases, i.e. for FIGS. 4c) and 5c), the relative deviation between the second reference value and the amplitude maximum is more than −30%. Therefore, the reliability of the present test regarding a single point scattering center can be strongly improved by taking into account the second reference value as well. However, the computational effort is slightly increased if both reference values are considered.

It should be noted that "slight irregularities" can already be observed in the phase trajectories of the superposition 407, 507 in FIGS. 4a) and 5a), i.e. a slight deviation from a straight line. Therefore, it could also be possible to perform a test regarding a single point scattering center by analyzing the phase trajectories only, i.e. without performing the beam-forming Fourier transform. However, a deviation from a straight line in the phase trajectories might not be identified unambiguously, especially for data having a low signal-to-noise ratio.

Instead, according to the inventive method the deviation of the amplitude maximum from the expected reference values can be identified in a reliable manner. For a given signal-to-noise ratio which can be estimated from the received data, a respective threshold is defined for the deviation between the first and second reference values and the amplitude maximum as calculated according to formula (7) and (9). If the absolute values of the deviations are larger than the respective thresholds, the scattering center under test (SUT) is identified as not being a single point scattering center.

While this invention has been described in terms of the preferred embodiments thereof, it is not intended to be so limited, but rather only to the extent set forth in the claims that follow.

I claim:

1. A vehicle-based method of determining an extent to which a target object is or is not a single point scattering center, wherein a vehicle comprises a radar system including a controller, at least one radar transmit element adapted to send a radar signal towards the target object, and a plurality of antenna receiver elements, each antenna receiver element of the plurality of antenna receiver elements being adapted to receive radar signals reflected from the target object, the method comprising:
    a) transmitting the radar signal from the at least one radar transmit element to the target object;
    b) receiving the reflected radar signals of the signal transmitted in step a) from the target object at the plurality of antenna receiver elements;
    c) performing, by the controller, a frequency transformation of the reflected radar signals in order to create a range-Doppler map for each antenna receiver element of the plurality of antenna receiver elements;
    d) generating, by the controller, a beam vector by selecting a respective value from each of the range-Doppler maps as an element of the beam vector corresponding to a respective antenna receiver element;
    e) processing, by the controller, the beam vector by a Fourier transform and calculating a peak amplitude from the Fourier transform;
    f) calculating, by the controller, a reference value based on the elements of the beam vector;
    g) comparing, by the controller, the peak amplitude with the reference value to determine a relative deviation of the peak amplitude with respect to the reference value; and
    h) determining, by the controller, that the target object is a single point scattering center when the relative deviation is smaller than a threshold.

2. The method according to claim 1, wherein
    step f) comprises calculating the reference value based on a sum of absolute values of the beam vector elements.

3. The method according to claim 1, wherein the reference value is greater than or equal to the peak amplitude.

4. The method according to claim 1, wherein the reference value represents a maximum amplitude of the Fourier transform that can be expected from the single point scattering center.

5. The method according to claim 1, wherein the threshold is calculated based on the signal-to-noise ratio of the reflected signals.

6. The method according to claim 1, the method further comprising before step e):
    normalizing the elements of the beam vector.

7. The method according to claim 6, the method further comprising:
    before normalizing the elements of the beam vector, calculating absolute values of the beam vector elements;
    determining a second reference value based on a maximum absolute value of the maximum of the absolute values; and
    in step g), additionally comparing the peak amplitude with the second reference value.

8. The method according to claim 1, wherein
    step d) comprises selecting the respective values at a frequency location of a local amplitude maximum within each of the range-Doppler maps, wherein the local amplitude maximum is particularly determined in a non-coherently integrated range-Doppler map.

9. The method according to claim 1, wherein:
    the radar system comprises N receiver elements, wherein N is an integer greater than 1, and step c) comprises performing N two-dimensional Fourier transforms in order to create N range-Doppler maps for the N receiver elements.

10. The method according to claim 1, the method further comprising:
    i) performing, by a navigation system of the vehicle, a self-localization and mapping procedure for the vehicle using the target object as a landmark.

11. A vehicle-based radar system of a vehicle comprising:
    at least one radar transmit element adapted to send a radar signal towards a target object;
    a plurality of antenna receiver elements, each antenna receiver element of the plurality of antenna receiver elements being adapted to receive radar signals reflected from the target object; and
    a controller configured to:
        perform a frequency transformation of the reflected radar signals in order to create a range-Doppler map for each antenna receiver element of the plurality of antenna receiver elements;
        generate a beam vector by selecting a respective value from each of the range-Doppler maps as an element of the beam vector corresponding to a respective antenna receiver element;
        process the beam vector by a Fourier transform and calculating a peak amplitude from the Fourier transform;
        calculate a reference value based on the elements of the beam vector;
        compare the peak amplitude with the reference value to determine a relative deviation of the peak amplitude with respect to the reference value; and
        determine that the target object is a single point scattering center when the relative deviation is smaller than a threshold.

12. The vehicle-based radar system according to claim 11, wherein calculation of the reference value based on the elements of the beam vector comprises calculating the reference value based on a sum of absolute values of the beam vector elements.

13. The vehicle-based radar system according to claim 11, wherein the reference value is greater than or equal to the peak amplitude.

14. The vehicle-based radar system according to claim 11, wherein the reference value represents a maximum amplitude of the Fourier transform that can be expected from the single point scattering center.

15. The vehicle-based radar system according to claim 11, wherein the threshold is calculated based on the signal-to-noise ratio of the reflected signals.

16. The vehicle-based radar system according to claim 11, wherein the controller is further configured to:
    before processing of the beam vector by the Fourier transform, normalize the elements of the beam vector.

17. The vehicle-based radar system according to claim 16, wherein the controller is further configured to:
    before normalizing the elements of the beam vector, calculate absolute values of the beam vector elements;
    determine a second reference value based on a maximum absolute value of the maximum of the absolute values; and
    in comparing the peak amplitude with the reference value, additionally compare the peak amplitude with the second reference value.

18. The vehicle-based radar system according to claim 11, wherein generation of the beam vector comprises select the respective values at a frequency location of a local amplitude maximum within each of the range-Doppler maps, wherein the local amplitude maximum is particularly determined in a non-coherently integrated range-Doppler map.

19. The vehicle-based radar system according to claim 11, wherein:
    the vehicle-based radar system comprises N receiver elements, N being an integer greater than 1, and
    performance of the frequency transformation of the reflected radar signals comprises performing N two-dimensional Fourier transforms in order to create N range-Doppler maps for the N receiver elements.

20. The vehicle-based radar system according to claim 11, wherein the controller is further configured to:
    cause a navigation system of the vehicle to perform a self-localization and mapping procedure for the vehicle using the target object as a landmark.

* * * * *